April 14, 1953          H. L. BURNS          2,634,724
DISPOSABLE BREATHING MASK
Filed Oct. 22, 1949          3 Sheets—Sheet 1
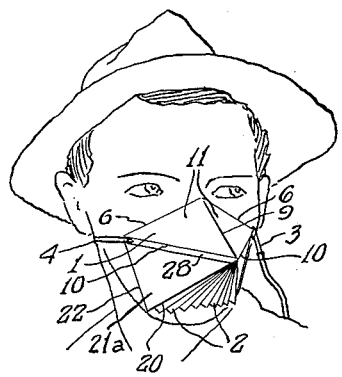
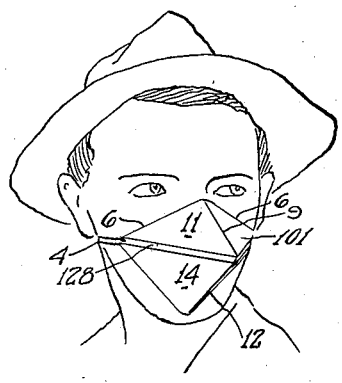
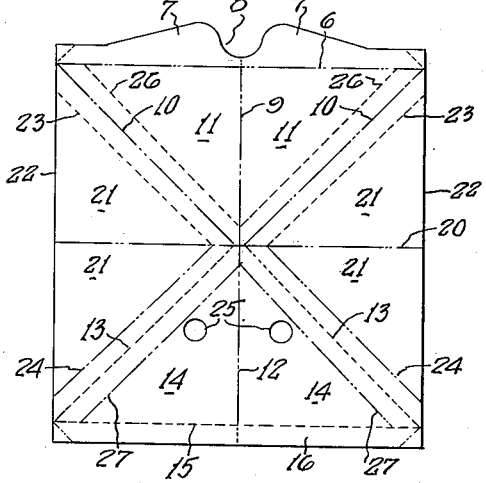
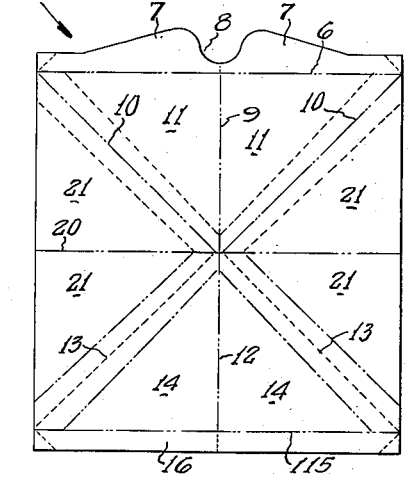
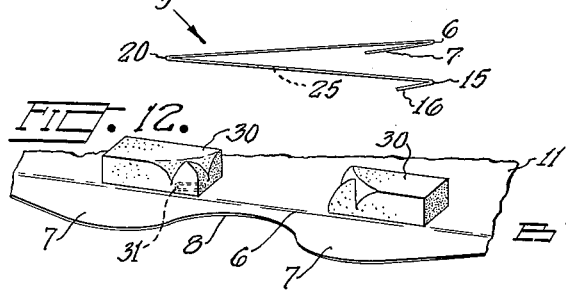
INVENTOR
HENRY L. BURNS
BY Cook and Schermerhorn
ATTORNEYS April 14, 1953 H. L. BURNS 2,634,724
DISPOSABLE BREATHING MASK
Filed Oct. 22, 1949 3 Sheets-Sheet 2
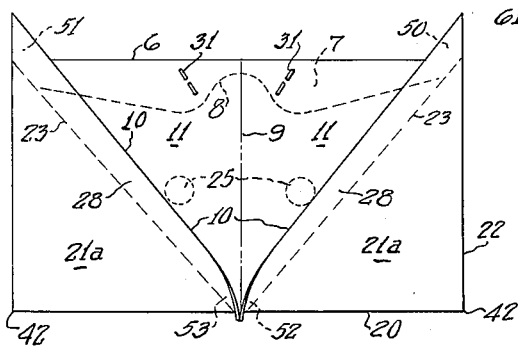
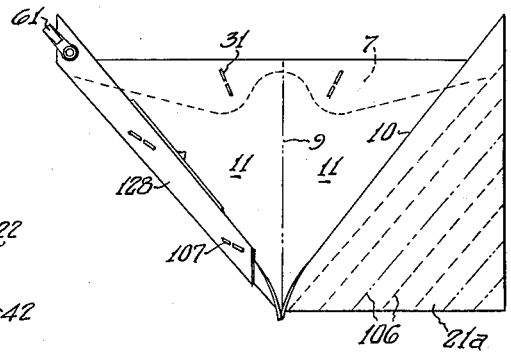
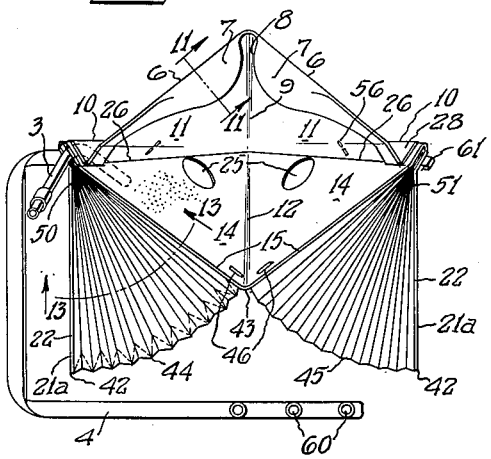
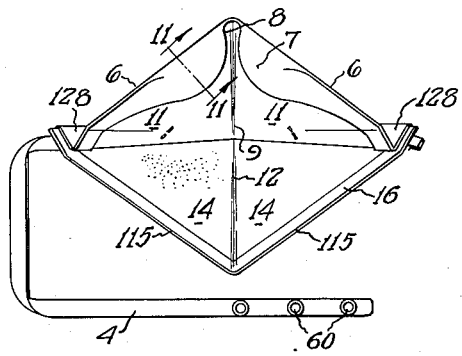
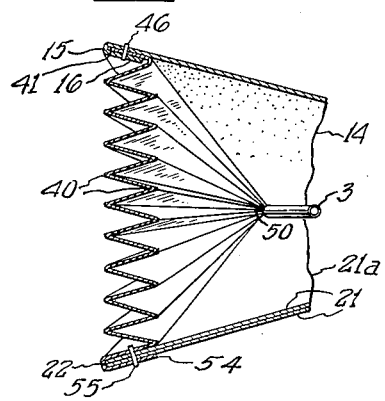
INVENTOR
HENRY L. BURNS
BY Cook and Achermerhorn
ATTORNEYS April 14, 1953  H. L. BURNS  2,634,724
DISPOSABLE BREATHING MASK
Filed Oct. 22, 1949  3 Sheets-Sheet 3

INVENTOR
HENRY L. BURNS
BY Cook and Schermerhorn
ATTORNEYS

Patented Apr. 14, 1953

2,634,724

UNITED STATES PATENT OFFICE 2,634,724

DISPOSABLE BREATHING MASK

Henry L. Burns, Portland, Oreg.

Application October 22, 1949, Serial No. 123,039

19 Claims. (Cl. 128—146)

1

This invention relates primarily to a re-breather type of oxygen mask, but certain features of the invention are utilized without others to provide an improved dust or paint spray mask.

In fields of activity such as military air transport, commercial aviation and oxygen therapy, oxygen is administered to large numbers of individuals. In the use of the conventional molded rubber face mask in large numbers there exists the problem of sterilization and restorage of the used masks. Where oxygen equipment is carried in pressurized aircraft in anticipation of an emergency requiring the use of oxygen, the volume and weight of the conventional rubber masks impose an extra burden in the carrying of such equipment which may never be used.

The foregoing problems have stimulated prior attempts to design an oxygen mask which could be made cheaply enough to be thrown away after each use, but the materials and forms of construction heretofore employed have resulted in masks still many times more expensive than sterilization and handling costs. A controlling factor, especially in aircraft use, is the need for oxygen economy which imposes certain design limitations. For example, the mask must fit the face tight, yet comfortably, the mask should cover both the mouth and the nose and yet have a minimum dead air space, and the mask must be of the re-breather type. A re-breather type oxygen mask incorporates in its structure and expanding and contracting chamber to contain incoming oxygen during expiration.

Objects of the present invention are, therefore, to provide an improved inexpensive breathing mask which may be replaced at less expense than the sterilization and handling costs of conventional masks, and to provide a breathing mask which is designed in such a manner that it can be fabricated by cutting and folding flat sheet stock such as paper, a plastic sheet material, or even sheet rubber, to eliminate expensive molding operations.

Another object is to provide a mask of the type described which may be folded compactly and stored in a flat condition.

A further object is to provide a re-breather type oxygen mask having the above features and advantages and, in addition, satisfying the particular requirements of aircraft use.

In practicing the invention, a breathing chamber is made to cover the nose and mouth of the wearer by folding a substantially square blank of flat sheet material to form a four sided pyramid having a substantially square and open base. The sides of the pyramid comprise flat triangular panels, each having a face engaging edge at the base of the pyramid. These panels extend between fold lines of the material, one of which fold lines extends forwardly across the top of the mask to overlie the nose of the wearer. In the oxygen mask the two underneath panels are equipped with openings or ports communicating with two triangular bellows mounted on the outsides of these panels. An oxygen tube extends into one of the bellows and the mask is equipped with an elastic band to hold it is position on the wearer. The bellows and face piece fold together to form a small flat package for storage. The dust or paint spray mask, hereinafter referred to simply as a painter's mask, embodies substantially the same construction in the face piece, but the bellows, ports and oxygen tube are omitted.

Still further objects and advantages will become apparent and the invention will be better understood with reference to the following specification relating to two preferred embodiments of mask illustrated in the accompanying drawings.

In the drawings:

Figure 1 is a view of the oxygen mask in use;

Figure 2 is a view of the dust or paint spray mask in use;

Figure 3 shows the blank and fold lines for the face piece of the oxygen mask;

Figure 4 shows the blank and fold lines for the painter's mask;

Figure 5 shows the first folding operations to be performed upon the blank shown in Figure 3;

Figure 6 shows the first folding operations to be performed upon the blank shown in Figure 4;

Figure 7 shows the oxygen mask in top plan view, with certain parts extended, prior to attachment of the bellows;

Figure 8 is a top plan view showing the painter's mask at an intermediate stage in its manufacture;

Figure 9 is a rear elevation view of the completed oxygen mask in position to be put on by the wearer;

Figure 10 is a rear elevation view of the completed painter's mask;

Figure 11 is a sectional view taken on the line 11—11 in Figures 9 and 10;

Figure 12 is a fragmentary perspective view showing the resilient pads behind the cheek flaps;

Figure 13 is a sectional view taken on the line 13—13 in Figure 9;

Figure 14:
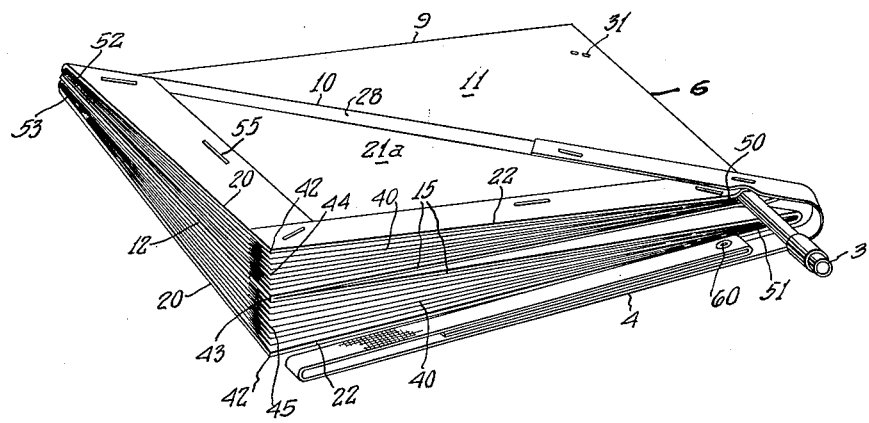
Figure 14 is a perspective view of the oxygen mask folded into a compact, flat package for storage.

Figure 1 shows the oxygen mask in use. The principal parts visible in this view comprise a face piece 1 defining a breathing chamber in the main mask cavity, a pair of flexible bellows 2 defining the re-breathing chambers, an oxygen tube 3, and an elastic 4 to hold the mask on the face of the wearer.

Figure 2 shows a dust or paint spray mask, the principal parts of which comprise merely the face piece 101 and the elastic band 4.

In both types of mask the face piece is folded in substantially the same way from a blank of sheet material. Identical folds and structural parts in the two masks are designated by the same reference characters from 1 to 100, while the parts and features peculiar to the painter's mask are designated by reference characters above 100. In Figures 3, 4, 7 and 8 dash lines designate fold lines where the material is folded upward, and dot and dash lines indicate fold lines where the material is folded downward from the plane of the view.

Figures 3, 5, 7 and 9 illustrate successive stages in the making of the oxygen mask, and the construction will be best understood by first describing how the mask is made. The blank 5 is cut to the approximately square shape shown in Figure 3 from some suitable inexpensive sheet material to make the face piece 1. A good grade of soft, porous crepe paper has been found to be satisfactory, but the invention is not limited to the use of this particular material. The downward fold line 6 turns the two cheek flaps 7 underneath so that this fold line forms the two upper face engaging edges 6 of the mask as shown in Figure 1. Between the cheek flaps 7, the material is cut away in a curved notch 8 to accommodate the nose of the wearer. The longitudinal medial downward fold line 9 appears as a forwardly extending corner in Figure 1 overlying the wearer's nose, and the two diagonal downward fold lines 10 appear as lateral folded edges, thereby defining a pair of triangular panels 11 which form the two top walls of the main breathing chamber of the mask cavity.

The downward fold 12 forms a longitudinal forwardly extending corner in the bottom of the breathing chamber opposite the fold 9, as best seen in Figure 9. On opposite sides of the fold 12 there are diagonal upward folds 13 which fit within the downward folds 10. The parallel reverse folds on opposite sides of the folds 10 and 13 in Figure 1 form a plurality of thicknesses of material in a narrow band adjacent the edges 10 as is apparent in Figure 9. The two triangular panels 14 between the folds 12 and 13 thereby form the bottom walls of the main breathing chamber lying opposite the top panels 11 so that when the mask is opened out as shown in Figure 9 the four triangular panels 11 and 14 form a four-sided pyramid having an approximately square base. This base includes the two edges 6 and also the two edges 15 which constitute the four face contacting edges of the mask.

The edge 15 is an upward fold in Figure 3 which produces a flap 16 to provide a double thickness of material along the lower edge of the mask. It will be appreciated that the outside surfaces of the panels 11 as viewed in Figure 1 are the top surfaces of these panels as viewed in Figure 3, and that the panels 14 do not appear in Figure 1. It will further be appreciated that the inside surfaces of the four panels 11 and 14, seen in Figure 9, are on the bottom side of the sheet shown in Figure 3.

A transverse medial downward fold 20 divides the remainder of the blank in Figure 3 into four triangular panels 21, the two adjacent panels 21 on each side of the mask thereby lying flat together to form a double thickness triangular wing panel 21a constituting a wall for one of the bellows 2. The fold 20 forms the forward edges of both wing panels 21a as seen in Figures 1 and 7, and the double edge 22 forms the bottom edges thereof. The material is not folded on the diagonal lines 23 and 24 in forming the mask, but these fold lines function as hinges for the wings 21a to facilitate operation of the bellows. Holes 25 provide communication between both bellows and the main breathing chamber.

In making these various folds it is preferred to start as shown in Figure 5 with the folds 6, 15 and 20, rather than to make them in the order described hereinabove.

The face piece thus folded may be spread out to appear in top plan view as shown in Figure 7 by flattening the folds 9 and 12 and drawing out the wings 21a to place them in a common plane with the panels 11. This is not a normal position of the parts, but serves to show the relationship of the wing panels 21a to the rest of the mask before attachment of the bellows. Disposed immediately beneath the hinge folds 23 are diagonal upward folds 26 of Figure 3, these folds appearing in Figure 9. There are also downward folds 27 at the lateral edges of panels 14 at the same place. It will be apparent in Figure 9 that the diagonal folds produce a narrow strip 28 adjacent each edge 10 having four thicknesses of material to reinforce and stiffen the mask.

The cheek flaps 7 are urged into engagement with the cheeks and sides of the nose by small resilient pads 30 of cotton or foam rubber or other suitable material secured to the panels 11 by staples 31, as best shown in Figures 7, 9, 11 and 12.

Figure 15:
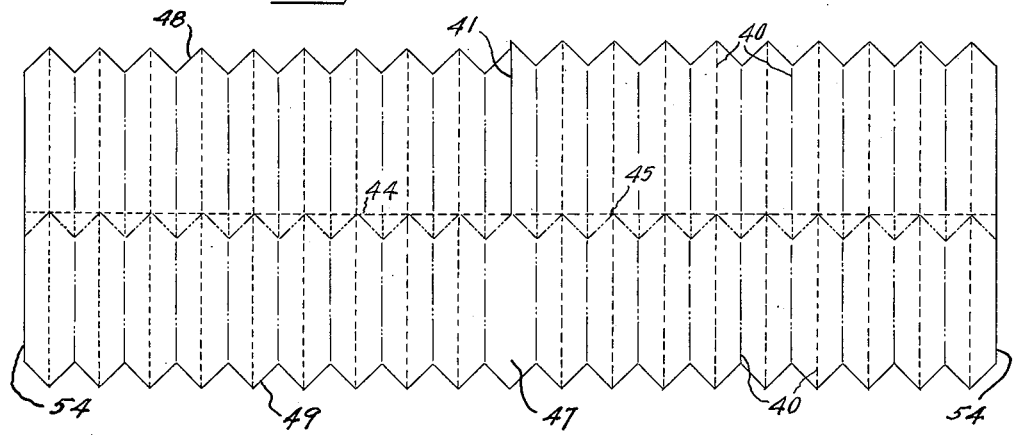
Figure 15 is a view of the blank for the bellows.

The two triangular bellows 2 are formed by folding accordion pleats in a single generally rectangular sheet of flexible non-porous material such as a thin and tough plastic film, shown in Figure 15. Each of these bellows is disposed between one of the panels 14 and its adjacent wing panel 21a, whereby the opening and closing movement of the bellows involves the swinging of the wings 21a on their hinge lines 23 to move the points 42 of the wings toward and away from the central point 43 at the intersection of fold line 12 with the edge 15. When the bellows are collapsed, each wing 21a lies flat against its adjacent panel 14 with the two wing points 42 coming together at the point 43. The inflated position is shown in Figure 9.

The corners 44 and 45 of the two bellows are formed by zigzag and straight fold lines extending down the longitudinal center line of the rectangular sheet intersecting transverse folds 40. At its midpoint along one side, the sheet is cut at 41 from one side to the longitudinal folds and the resulting transverse edges on opposite sides of the cut, as exemplified by the one edge 41 appearing in Figure 13, are folded under the flap 16 at the edge 15 and secured by some suitable means such as staples 46. It will be appreciated that the cut 41 in Figure 15 forms two edges 41, the same numeral being used to identify the edges with the cut which creates these edges. In Figure 13 the staple 46 is shown at the section line for convenience. The other side of the sheet is continuous at 47 and lies across the corner fold 12 to connect the two bellows and obviate the necessity for a gas tight joint along this fold. Thus the two edges 41 are separated to lie along the two edges 15 of the face piece in Figure 9, one edge 41 being in one bellows and the other edge 41 being in the other bellows.

Half of the side edge 48 in Figure 15 is gathered together at 50, and the remainder is gathered together at 51, in Figures 9 and 14. Corresponding parts of the opposite and unsevered side edge 49 are similarly gathered together at the respective points 52 and 53, shown in Figures 7 and 14. One of the ends 54 of the sheet is folded over the two edges 20 and 22 of one of the wings 21a and secured thereto by staples 55 or other suitable fastening means as shown in Figures 13 and 14, and the other end 54 is similarly folded over and secured to the corresponding edges of the other wing, it being remembered that the bellows sheet is in effect folded at right angles on its longitudinal fold lines forming the corners 44 and 45. At intermediate points along the edges 10 where there is no bellows material, the four thicknesses of the reversely folded face sheet in the strip 28 are secured by staples 56.

At the gather point 50, the elbow-shaped oxygen tube 3 extends into one of the bellows. This tube is included between the layers of material in the reinforcing strip 28 at the edge 10, and a sufficiently gas tight joint is made by applying additional staples which also serve to anchor one end of the elastic band 4. The band is equipped with eyelets 60 to engage a hook 61 riveted in a corresponding position through the reversely folded material on the other side of the mask.

Thus it will be apparent from Figure 9 that the four panels 11 and 14 provide a covering for the nose and mouth and define a pyramid shaped breathing chamber which may also be designated as the main mask cavity. The expanding and contracting re-breather volume is separated into two chambers comprising the triangular accordion bellows 2. The interiors of these bellows communicate with the main mask cavity through the ports 25. Oxygen is admitted in a steady flowing stream from a source of supply through the oxygen tube 3 into one of the bellows. The cheek flaps 7 backed up with the small resilient pads 30 provide a seal against excess leakage around the nose which would irritate the eyes. There is, of course, the possibility of some leakage at other points where the mask engages the face, but this may be desirable in addition to the natural porosity of the paper in the face piece to allow for limited inflow and outflow of air and gases. When the face piece is made of relatively non-porous material, holes may be provided in suitable locations to supplement the leakage flow if necessary.

Oxygen enters through the tube 3 in a continuous flow at a rate controlled by the oxygen supply system tending to inflate the reservoir bellows. At the start of the inspiratory phase of the breathing cycle, the oxygen-air mixture entering the lungs comes from the supply stored in the two bellows. Toward the end of inspiration, gases entering the respiratory system consist of air drawn in through the porous face piece mixed with the continuous flowing oxygen entering by way of tube 3, bellows 2, and port 25.

During expiration part of the expired gases supplement the incoming oxygen to re-expand the bellows, and thereafter the remainder of the expired gases leave the mask by way of any leakage spaces around the edges and through the porous material of the face piece. The bellows effect an oxygen economy by storing incoming oxygen during expiration and by capturing those unused gases expelled from the top portion of the user's respiratory system.

The double thickness of material in the wing panels 21a operates to reduce the effective porosity to prevent excessive loss of oxygen from the bellows. The porous area of these wing panels is somewhat reduced by the width of the flap of the non-porous bellows material which is attached thereto as shown in Figure 13, and the loss may be still further reduced, if desired, by providing a wider flap of the bellows material to overlie these wing panels or by inserting a triangular sheet of non-porous material to cover the whole wing panel. In the present form of construction, it is not difficult to make the stapled joints so that there is no appreciable loss of new oxygen from the bellows to the atmosphere.

The mask folds on the lines 9, 12 into a flat square package for the storage as shown in Figure 14. Thus, the advantages of inexpensive manufacture, light weight, and small storage volume, are attained without sacrificing any of the performance features and requirements of the conventional expensive, heavy and bulky masks.

The painter's mask shown in Figure 2 is made in the same way as the oxygen mask just described, except that it lacks the bellows, ports 25, and the oxygen tube 3. The successive steps in making the painter's mask are shown in Figures 4, 6, 8 and 10.

The blank 105 shown in Figure 4 is the same as the blank 5 in Figure 3 without the holes 25. Figure 8 shows the different disposition made of the wings 21a. These wings are folded up compactly on the fold lines 106 and secured by staples 107 along the edges 10 to provide a reinforcing strip 128 for the mask, and especially at the points of attachment of band 4 and hook 61. The flap 16 is folded down on its fold line 115, as indicated in Figures 4 and 6, to dispose this flap inside the mask.

Thus, the painter's mask has a single cavity of pyramid shape bounded by the four triangular panels 11 and 14 as shown in Figure 10. In both inspiration and expiration, the breathing air passes through the porous paper to filter out any dust or liquid particles.

In both forms of mask the joints are secured solely by staples without the use of adhesive, but it is within the scope of the invention to use any convenient securing means or combination of means.

Having now described my invention and in what manner the same may be used, what I claim as new and desire to protect by Letters Patent is:

1. A breathing mask comprising a flat blank porous material having fold lines defining four triangular panels forming a pyramid having as its base edge portions of the four panels, said edge portions being adapted to engage the face of the wearer, and inturned cheek flaps on two of said edge portions adapted to lie flat against the face of the wearer on opposite sides of the nose.

2. A breathing mask comprising a sheet of porous material having a plurality of fold lines defining triangular panels forming a pyramid in which the base of the pyramid is adapted to engage the face of the wearer with one of said fold lines aligned with the wearer's nose, and inturned cheek flaps on the two panels on opposite sides of said fold line to prevent exhalation leakage at the sides of the nose.

3. A breathing mask comprising a plurality of panels of porous sheet material forming a breathing chamber of generally pyramidal shape in which the base of the pyramid is adapted to engage the face of the wearer, cheek flaps on said base portion, and resilient cushion means behind said cheek flaps to hold the flaps in engagement with the wearer's face on opposite sides of the nose.

4. In a breathing mask, a sheet of material having folds defining wall panels for the mask, and parallel reverse folds forming reinforcing strips of multiple thickness extending along certain of said first mentioned folds, said panels folding compactly into a flat package.

5. In a breathing mask, a plurality of flat panels extending between fold lines in a sheet of material and forming the walls of the mask, and additional panels between said lines folded into narrow reinforcing strips extending along two of said fold lines between adjacent walls of the mask for the attachment of holding means to engage the head of a wearer, said wall panels folding compactly into a flat package.

6. A re-breather type oxygen mask comprising a breathing chamber having a plurality of flat, folding panels, and a bellows on one side of one of said panels constituting a re-breather chamber, said one panel forming a common wall between said breathing chamber and re-breather chamber, said bellows and panels folding compactly together for storage of the mask in a flat package.

7. In a re-breather type oxygen mask, a breathing chamber comprising a folded sheet of porous material, and a re-breather chamber comprising a bellows covering an area of said mask between said folds, said mask area forming a common wall between said breathing chamber and re-breather chamber.

8. In a re-breather type oxygen mask, a breathing chamber comprising a folded sheet of porous material having a plurality of flat panels extending between fold lines, and a bellows mounted on one of said panels between said fold lines to form a re-breathing chamber, said bellows and breathing chamber folding compactly together in a flat package for storage.

9. In a re-breather type oxygen mask, a breathing chamber having a plurality of wall panels extending between fold lines in a sheet of flat stock material, an exterior wing panel overlying one of said wall panels and hingedly connected thereto on said fold lines, and a bellows between said wing panel and said wall panel forming a re-breathing chamber.

10. In a re-breather type oxygen mask, a breathing chamber having folding wall panels, a folding wing panel overlying one of said wall panels, and a bellows interconnnecting said wing panel and said one wall panel to form a re-breathing chamber.

11. A re-breather type oxygen mask having a breathing chamber comprising a plurality of folding panels, an expansible re-breather chamber mounted on the outside of one of said panels, a port in said panel, said breathing chamber and re-breather chamber folding compactly together into a flat package.

12. In a re-breather type oxygen mask, a breathing chamber comprising a plurality of flat panels extending between fold lines in a single sheet of material, cheek flaps on two of said panels, and bellows forming re-breather chambers on two of said panels, said bellows and breathing chamber folding compactly together in a flat package for storage.

13. In a re-breather type oxygen mask, a breathing chamber of generally pyramidal shape having four triangular panels extending between fold lines in a sheet of porous material, cheek flaps on two of said panels, bellows constituting re-breather chambers on two of said panels, ports in said last mentioned panels for communication between said breathing chamber and said re-breather chambers, and an oxygen tube leading into one of said bellows.

14. In a re-breather type oxygen mask, a pyramidal breathing chamber comprising a plurality of triangular panels extending between fold lines in a sheet of flat stock material, triangular bellows forming re-breather chambers on two of said panels, ports in said last mentioned panels, and an oxygen tube extending into one of said bellows.

15. In a re-breather type oxygen mask, a sheet of material having folds defining wall panels for a breathing chamber and folding wing panels, and bellows extending between said wing and wall panels forming re-breather chambers.

16. In a re-breather type oxygen mask, an approximately square blank of sheet material, said blank having fold lines defining triangular wall panels forming a substantially pyramidal breathing chamber, and said fold lines also defining triangular wing panels overlying two of said breathing chamber panels and hingedly connected therewith on certain of said fold lines to form end walls for a pair of triangular bellows.

17. In a re-breather type oxygen mask, an approximately square blank of sheet material having longitudinal and transverse medial fold lines and diagonal fold lines defining triangular panels of a substantially pyramidal breathing chamber, and defining triangular wing panels for re-breather bellows.

18. In a breathing mask, an approximately square blank of porous sheet material having diagonal fold lines, a medial fold line bisecting one pair of vertical angles between said diagonal fold lines forming triangular wall panels for the mask adjacent two opposite edges of said blank, and reinforcing strips for the left and right sides of the mask folded from material in the other pair of vertical angles between said diagonal fold lines.

19. A re-breathing type oxygen mask comprising a breathing chamber having a plurality of flat wall panels connected together by straight fold lines, said wall panels folding flatly together, and a re-breather chamber having collapsible walls attached to said wall panels and communicating with said breathing chamber, said breathing chamber and re-breather chamber folding compactly together into a flat package.

HENRY L. BURNS.

References Cited in the file of this patent

UNITED STATES PATENTS

| Number | Name | Date |
|---|---|---|
| 7,476 | Lane | July 2, 1850 |
| 1,020,617 | Matthews | Mar. 19, 1912 |
| 2,248,477 | Lombard | July 8, 1941 |
| 2,321,256 | Shelton | June 8, 1943 |
| 2,507,447 | La Joie | May 9, 1950 |
| 2,565,124 | Durborow | Aug. 21, 1951 |

FOREIGN PATENTS

| Number | Country | Date |
|---|---|---|
| 280,674 | Italy | Dec. 28, 1929 |
| 809,510 | France | Dec. 12, 1936 |